United States Patent [19]
Van Dijk et al.

[11] 3,800,042
[45] Mar. 26, 1974

[54] NEW (THENYLIDENE AMINO)OXY) ALKYL CARBOXYLIC ACIDS AND SALTS AND ESTERS THEREOF AS ANALGESIC AND ANTI-INFLAMMATORY AGENTS

[75] Inventors: Jan Van Dijk; Johannes Maria Antonius Zwagemakers, both of van Houtenlaan, Weesp, Netherlands

[73] Assignee: U.S. Philips Corporation, New York, N.Y.

[22] Filed: Oct. 24, 1972

[21] Appl. No.: 300,434

Related U.S. Application Data

[62] Division of Ser. No. 26,756, April 8, 1970, Pat. No. 3,704,911.

[30] Foreign Application Priority Data
Apr. 10, 1969 Netherlands.................... 6905499

[52] U.S. Cl. .............................................. 424/275
[51] Int. Cl............................................. A61k 27/00
[58] Field of Search...................... 424/275, 26, 756

[56] References Cited
OTHER PUBLICATIONS

Richardson, J. Med. Chem. 7(6):824–826 (1964).
Undheim et al., Acta Chem. Scand. 19(2):317–324 (1965).

Primary Examiner—Stanley J. Friedman
Attorney, Agent, or Firm—Frank R. Trifari; Norman N. Spain

[57] ABSTRACT

Certain [(thenylidene amino) oxy] alkyl carboxylic acids their esters and salts have been found to have strong anti-inflammatory activities and analgesic analgesic 5 Claims, No Drawings

NEW (THENYLIDENE AMINO)OXY) ALKYL CARBOXYLIC ACIDS AND SALTS AND ESTERS THEREOF AS ANALGESIC AND ANTI-INFLAMMATORY AGENTS

This is a continuation, division, of application Ser. No. 26,756, filed Apr. 8, 1970 and now U.S. Pat. No. 3,709,911.

The invention in this case relates to novel [(thenylidene amino) try] alkyl-carboxylic acids their salts and esters and to the use of these compounds as anti-inflammatory and analgetic agents.

Some compounds are known for the treatment of rheumatic afflictions and similar illnesses. However, these known compounds are of little value chiefly because of undesirable side effects or of a high toxicity level.

It is an object of this invention therefore to provide a new group of compounds having strong anti-inflammatory and analgetic activities while at the same time exhibiting low toxicity levels.

This and other objects of the invention will be apparent from the description that follows:

According to the invention a new and novel group of [(thenylidene amino) oxy] alkyl carboxylic acids, salts and esters thereof have been prepared. These novel compounds have the general formula I:

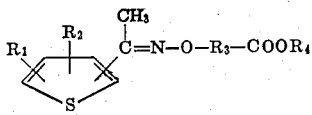

wherein $R_1$ and $R_2$ are each independently hydrogen,- halogen such as fluorine, chlorine, bromine or iodine or methyl, $R_3$ is alkylene of one to three carbon atoms inclusive for example methylene, ethylene and isopropylene, $R_4$ is hydrogen, alkyl of one to five carbon atoms inclusive for example methyl, ethyl, isobutyl and pentyl, alkali metal such as K and Na or the group $N(H)_{4-a}(R_6)_a$ wherein $a$ is an integer of 0 to 3 inclusive and $R_6$ is an alkyl of one to five carbon atoms inclusive or a monohydroxyalkyl of one to five carbon atoms inclusive preferably of one to two carbon atoms, examples of this group being $NH_4$, $(C_2H_5)_2NH_2$, $(C_2H_5)_3NH$, $(C_2H_4OH)_3NH$, $(C_2H_4OH)(CH_3)_2NH$ and $(C_2H_4OH)_2(C_2H_5)NH$.

It has been found that these novel compounds of the invention are useful in that they generally have strong antiinflammatory activities along with strong analgetic activities accompanied only by a very low level of toxicity.

It has been found that especially compounds of the general formula

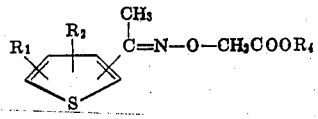

wherein $R_1'$ is bromine or chlorine and $R_2'$ is hydrogen, bromine or chlorine have a high therapeutic index. This applies particularly to the compound [(α-methyl-5-chloro-2-thenylidenamino) oxy] acetic acid and its salts.

Because of their pharmaceutical properties the compounds of the invention are useful in treating such diseases of mammals as rheumatoid arthritis, Bechterews' disease, arthritis psoriacta, collagen diseases, osteoarthrosis, acute lumbago, humeroscapular periarthritis, acute sterile non-infected bursitis, thrombophlebitis and acute rheumatic polyarthritis.

The dosage which, and the frequencies at which, the compounds are to be administered for treating these afflictions depends on the seriousness thereof. As a rule, the physician treating the patient will have no difficulty in arriving at the right treatment. Generally, from 50 to 1,000mg daily will be administered to the patient, which may be divided into several portions. As a rule, 100 to 500 mg daily will be sufficient. The compounds may be administered orally, parenterally or rectally.

The anti-inflammatory effect of the compounds was determined by the carraghenin test carried out according to a modification of the method of Winter, Risley and Nuss, Proc. Soc. Exp. Biol. 111 - 544 - (1962).

In this test the reduction of the edema produced by carraghenin serves as a measure of the anti-inflammatory activity.

The test was made with male rats, weight about 220 g. The animals were made to fast for the 16 hours preceding the test. The substance to be tested is suspended in 1 percent tragacanth solution and administered orally. The administration of the substance is immediately followed by water loading up to 5 ml per amimal. 1 hour after the administration of the test substance and the water loading 0.05 ml of a 1½ percent carraghenin solution is injected intraplantarly and the thickness of the legs (dorsal plantar distance) is determined by means of a specially constructed micrometer.

Three hours after the administration of the carraghenin the thickness of the edema produced is determined. The swelling of the leg is expressed as a percentage relative to the zero-hour value. The percentage of the inhibition is calculated according to the relation:

$$\frac{\text{Percent blank} - \text{Percent test group}}{\text{Percent blank} - 100}$$

From the results of a series of dosages an $ED_{50}$ value was computed. This is the amount which causes a reduction of 50 percent relative to the blank % group.

The analgetic activity of the compounds was determined according to a modification of the method of Randall and Sellito (Arch. Int. Pharmacodyn. 109 - 409 - (1957).

The decrease of the response to pain due to increasing pressure of a rat's leg inflamed by means of yeast serves as a criterion for the analgetic effect.

The test is performed on male rats having weights between 100 and 150 g. One hour before the administration of the test preparation the animals are intraplanatarly injected with 0.1 ml of a 20 percent yeast suspension. The compound to be tested are suspended in a 1 percent tragacanth solution and administered orally. One hour, two hours and four hours after the administration of the test substance, the pain threshold is measured with increasing pressure on the inflamed leg.

As a control the pain reactions of a group of animals which have not been treated with the pharmacon are determined.

These results are expressed as a percentage of the mean blank value.

From the results of a series of dosages an $ED_{50}$ value was computed, i.e., the dosage which produces a 100 percent rise of the pain threshold.

The compounds of the invention may be prepared according to methods analogous to those known in the art for preparing similar compounds.

The compounds according to the invention are obtainable, for example, by reacting a compound of the formula II

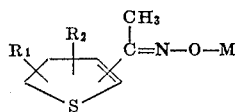

which can be produced from the corresponding ketone by means of hydroxyl amine, with a compound of the formula III

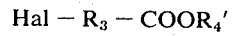

in which formulae $R_1$ to $R_3$ have the same meanings as in the formula I, M is a metal atom, for example Na or K, Hal is a halogen atom, for example chlorine or bromine and $R_4'$ is hydrogen, an alkyl containing up to five carbon atoms or an alkali metal, and, if desired, by converting the resulting acids into salts. The reaction is preferably performed in a polar solvent such as dimethyl formamine, dimethyl sulphoxide, alcohols and the like, at temperatures between room temperature and the boiling temperature of the reaction mixture and in the presence of an acid binder, such, for example, as an ethanolate.

The compounds according to the invention may alternatively be prepared by reacting a compound of the general formula IV

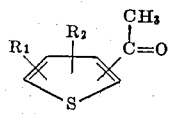

with a compound of the general formula V

in which formulas the symbols have the same meanings as in the formula I. This reaction also is preferably carried out in a polar inert solvent, for example one of the aforementioned solvents. As a rule, the reaction temperature will lie between room temperature and the boiling point of the solvent.

The compounds of the formula VI

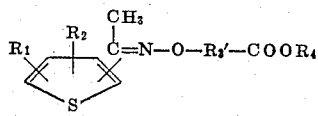

in which formula $R_1$, $R_2$ and $R_4$ have the same meanings as in the formula I and $R_3'$ represents a propylene or a possibly branched methylene group, can be prepared by reacting a compound of the formula II with a compound of the formula VII:

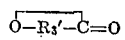

after which the resulting acids may be esterified or converted into their salts. The reaction is preferably performed in an inert solvent such, for example, as N-methyl-2-pyrrolidon, benzene and the like, at temperatures between room temperature and the boiling point of the solvent.

The compounds of the formula VI may alternatively be produced by reacting a compound of the formula II with a compound of the formula VIII,

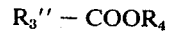

where $R_3''$ is an ethylene group of a propenyl 1, -2 or -3 group. The reaction is preferably performed in an inert solvent, for example in an alcohol, for example ethanol. The reaction temperature as a rule lies between 0°C and the boiling point of the reaction mixture.

The compounds of the formula I may also be obtained by saponifying a nitrile of the formula IX

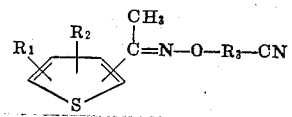

where $R_1$ to $R_3$ have the same meanings as in the formula I, with an alkaline solution and, if desired, by converting the resulting salt into other salts, into the free acid or into an ester. The reaction is preferably carried out in an inert solvent, such as an alcohol, at a temperature below the boiling point of the reaction mixture.

The nitriles of the formula IX are obtainable by converting a halogen alkyl nitrile with a compound of the formula II in a polar solvent.

Esters of the formula X,

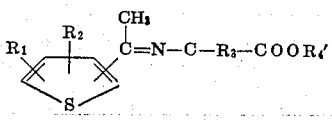

where $R_4''$ represents an alkyl group containing up to five carbon atoms and $R_1$ to $R_3$ have the same meanings as in the formula I, may alternatively be obtained by reacting a nitrile of the formula IX with an alcohol $R_4''OH$ in the presence of an acid and by subsequently decomposing the reaction product with water. The reaction is preferably carried out in an inert solvent, for example an ether, such as diisopropyl ether. The reaction temperature lies between 0°C and 40°C. Acids of the formula I may be converted into the corresponding esters of the formula I with alcohols, if required via the acid chlorides. From esters of the formula I the acids of the formula I are obtainable by saponification.

The compound according to the invention may be made up into pharmaceutical preparations such as, for example, tablets, pills, powders, injection liquids, salves, suppositories, dragees and the like, by known methods. Hence, the invention also relates to the production of pharmaceutical preparations and to the preparations themselves.

As carrier materials the substances commonly used in pharmaceutics may be employed.

Examples of such carrier materials are water, corn starch, gelatine, lactulose, succrose, talc, vegetable gums, propylene glycol, polyalkylene glycols, white petroleum jelly and other known pharmaceutical carriers.

The pharmaceutical composition of the invention is useful in treating many mammals including dogs, horses as well as humans.

The invention will now be described more fully with reference to the following examples:

1. [(α-methyl-4-bromo-2-thenylidene amino)oxy] acetic acid.

A solution of 4.2 g of 4-bromo-2-acetylthiophene in 42 ml of ethanol was mixed with 2.2 g of hemihydrochloride of 2-amino oxyacetic acid and then with a hot solution of 4.90 g anhydrous sodium acetate in 8 ml of water. The reaction mixture was then boiled under a reflux condenser for 3 hours. After a small amount of solvent had been distilled off in a vacuum, the sodium salt of the reaction product crystallized out. This was filtered off and the filtrate was evaporated further in a vacuum. The solid substance filtered off was dissolved, together with the obtained residue, in 100 ml of water, 20 ml of 2 N solution of caustic soda and 30 ml of ether. The ethereal layer was separated off and the alkaline layer was extracted 2 times with 40 ml of ether. The alkaline water layer was then acidified with 10 ml of concentrated hydrochloric acid and again extracted 3 times with ether. The latter ethereal extract was dried over anhydrous sodium sulfate, and subsequently the solvent was removed. The resulting [(α-methyl-4-bromo-2-thenylidene amino)oxy] acetic acid was crystallized from a small amount of benzene (2 g from 10 ml) and melted at 140° – 141°C.

2. [(α-methyl-5-chloro-2-thenylidene amino)oxy] acetic acid.

A solution of 5.4 g of 5-chloro-2-acetyl thiophene in 100 ml of 80 percent ethanol was mixed with 4.4 g of hemihydrochloride of aminooxyacetic acid and 9.8 g anhydrous sodium acetate, and the mixture was boiled under a reflux condenser for 1 hour. The reaction mixture was then evaporated to dryness in a vacuum, the residue being mixed with 75 ml of 2N solution of caustic soda. The mixture was washed 2 times with ether. The alkaline water layer was then acidified with 125 ml of 2 N hydrochloric acid and then extracted 3 times with ether. The latter ethereal extract was washed 3 times with small amounts of water and then dried over anhydrous sodium sulfate. The solvent was removed from the dried solution by evaporation, and the residue was crystallized with a mixture of benzene and petroleum ether. Thus, the [(α-methyl-5-chloro-2-thenylidene amino)oxy] acetic acid crystallized out which had a melting range from 116°C to 132°C.

In a manner corresponding to those described in examples 1 and 2 there were produced:

3. [(α-methyl-2-thenylidene amino)oxy] acetic acid, melting range 91°C – 118°C.

[(α-methyl-3,4-dibromo-2-thenylideneamino)oxy] acetic acid, melting point 166° – 168°C.

5. [(α-methyl-2,5-dichloro-3-thenylideneamino)oxy] acetic acid, melting point 97°C – 98°C.

6. [(α,5-dimethyl-2-thenylideneamino)oxy] acetic acid.

To a solution of 1.85 g of sodium in 150 ml of ethanol there were successively added, with stirring, 6.2 g of 5-methyl-2-acetyl-thiophene oxime and 7,8 g of bromoacetic acid. The mixture was stirred for 1 hour, after which the ethanol was removed in a vacuum. The resulting residue was mixed with water, the mixture being extracted 3 times with ether. The aqueous alkaline solution was acidified with 2 N hydrochloric acid and again extracted 3 times with ether. The latter ethereal extract was washed 4 times with water and then dried over anhydrous sodium sulfate. After the solvent had been distilled off, the residue was crystallized from a mixture of benzene and petroleum ether. The resulting [(α,5-dimethyl-2-thenylidene amino)oxy] acetic acid melted at 126-127°C.

7. 4-[(α-methyl-5-chloro-2-thenylidene amino)oxy] butyric acid.

2.0 g of 5-chloro-2-acetylthiophene oxime was added to a solution of 0.26 g of sodium in 15 ml of absolute ethanol. After the oxime had dissolved, the solvent was distilled off in a vacuum and the residue was dissolved with heating in 10 ml of N-methylpyrrolidon-2. To this solution there was added 0.87 ml of butyrolactone. The mixture was boiled under a reflux condenser for 4 hours. The hot reaction mixture was then poured in water and the aqueous solution was filtered. The filtrate was acidified with acetic acid and the solid precipitate was drawn off. This solid substance was dissolved in acetone, the acetonic solution was treated with activated carbon and, after filtration, evaporated to dryness. The residue was crystallized from 30 percent acetic acid, the 4—[(α-methyl-5-chloro-2-thenylidene amino)oxy] butyric acid being obtained, melting point 92°C–96°C.

8. 2-[(α-methyl-5-chloro-2-thenylidene amino)oxy] acetic acid methyl ester.

A solution of 1.0 g of 2-[(α-methyl-5-chloro-2-thenylidene-amino)oxy] acetic acid in 10 ml of methanol was mixed with 3 drops of concentrated sulfuric acid and then boiled under a reflux condenser for 18 hours. The methanol was then distilled off in a vacuum and the residue was dissolved in 25 ml of ether. The ethereal solution was washed successively with water (3 times with 10 ml), with 10 ml of 2N sodium hydroxide and again 3 times with 10 ml of water. The solution was then dried over anhydrous sodium sulfate and, after filtration, evaporated in a vacuum. The residue, 2—[(α-methyl-5-chloro-2-thenylidene amino)oxy] acetic acid methyl ester, was crystallized from 47 ml of petroleum ether, boiling range 40°C–60°C. Melting point 99°–101°C.

9. Tablet containing 0.2 g of [(α-methyl-5-chloro-2-thenylidene amino)oxy] acetic acid.

200 g of [(α-methyl-5-chloro-2-thenylideneamino) oxy] acetic acid was mixed with 190 g of sec. calcium phosphate, 90 g of microcrystalline cellulose and 120 g of a mixture consisting of 200 parts of maize starch, 32 parts of talcum and 4 parts of magnesium stearate, until the mixture was homogeneous. From this mixture tablets having a diameter of 13 mm and a weight of 600 mg were struck.

10. Suppository containing 0.1 g of [(α-methyl-5-chloro-2-thenylidene amino)oxy] acetic acid.

100 mg of [(α-methyl-5-chloro-2-thenylidene-amino) oxy] acetic acid was formulated with 1.5 g of suppository material into a suppository.

11. Injection liquid 100 mg of [(α-methyl-5-chloro-2-thenylidene-amino) oxy] acetic acid was dissolved in an equimolar amount of 1 N sodium hydroxide, and the solution was mixed with 15 g of benzyl alcohol. This solution was then diluted to a volume of 1,000 ml with distilled water. It was then strained through a bacterial

What we claim is:

1. A pharmaceutical composition having anti-inflammatory and analgetic activities comprising a compound of the formula:

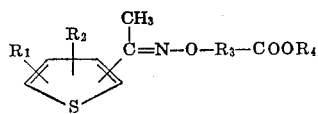

wherein $R_1$ is a moiety selected from the group consisting of chlorine and bromine, $R_2$ is a moiety selected from the group consisting of hydrogen, chlorine and bromine, $R_2$ is methylene and $R_4$ is a moiety selected from the group consisting of hydrogen, alkyl of one to five carbon atoms inclusive, alkali metal and an ammonium group of the formula $N(H)_{4-a}(R_6)_a$ wherein a is an integer of 0 to 3 inclusive and $R_6$ is a moiety selected from the group consisting of alkyl of one to five carbon atoms inclusive and monohydroxyalkyl of one to five carbon atoms inclusive in a therapeutically effective amount and a finely divided pharmaceutical carrier.

2. The pharmaceutical composition of claim 1 wherein the compound is 2-[α-methyl-5-chloro-2-thenylidene amino)oxy] acetic acid methyl ester.

3. A method of effecting analgesic and anti-inflammatory activity in a patient comprising administering to said patient a pharmaceutical preparation of claim 1 in a therapeutically effective amount.

4. The method of claim 3 wherein the preparation is orally administered.

5. The method of claim 3 wherein the preparation is parenterally administered.

* * * * *